United States Patent [19]

Kobayashi et al.

[11] Patent Number: 5,436,068
[45] Date of Patent: Jul. 25, 1995

[54] SELECTIVELY TRANSMISSIVE POLYSULFONIC HOLLOW FIBER MEMBRANE

[75] Inventors: Takuichi Kobayashi, Shiga; Kazumi Tanaka, Otsu, both of Japan

[73] Assignee: Toray Industries, Inc., Tokyo, Japan

[21] Appl. No.: 858,998

[22] Filed: Mar. 30, 1992

[30] Foreign Application Priority Data

Mar. 28, 1991 [JP] Japan ................. 3-064760

[51] Int. Cl.⁶ ................. B32B 5/14; D02G 3/00; B01D 39/14
[52] U.S. Cl. ................. 428/308.4; 210/500.23; 210/500.41; 210/504; 428/398
[58] Field of Search .............. 428/398, 308.4; 210/500.23, 500.41, 504

[56] References Cited

U.S. PATENT DOCUMENTS

| | | | |
|---|---|---|---|
| 4,113,912 | 9/1978 | Okita | 428/290 |
| 4,798,847 | 1/1989 | Roesink et al. | 521/50 |
| 4,876,289 | 10/1989 | Itoh et al. | 521/54 |
| 4,957,942 | 9/1990 | Yoshida et al. | 521/62 |
| 5,104,729 | 4/1992 | Stedronsky | 428/304.4 |
| 5,160,627 | 11/1992 | Cussler et al. | 210/639 |

*Primary Examiner*—James C. Cannon
*Attorney, Agent, or Firm*—Fish & Richardson

[57] ABSTRACT

A hollow polysulfonic fiber intended for a selectively transmissive membrane contains a hydrophilic polymer which is cross-linked into a water-insoluble form (for example polyvinylpyrrolidone) and is used in the form of a hydrogel containing water. A method for the production of a membrane module consists in spinning a hollow fiber by the use of a spinning solution containing a polysulfonic resin and a hydrophilic polymer, wetting the fiber above the saturated moisture content, and then, with the wet condition maintained, subjecting the fiber to the processes of module molding and radiation induced cross-linking, these processes being performed in either order. The method provides a selectively transmissive hollow polysulfone fiber membrane which displays less elution into water and a sharp molecular weight fractionation, so as to be usable safely in the fields of medicine and foodstuffs.

9 Claims, 4 Drawing Sheets

SELECTIVELY TRANSMISSIVE POLYSULFONIC HOLLOW FIBER MEMBRANE

FIELD OF THE INVENTION

This invention relates to a module containing a high performance hollow fiber membrane containing a hydrophilic polymer.

BACKGROUND OF THE INVENTION

A module containing a membrane comprising a hydrophobic polysulfonic resin polymer is extensively used in various fields on account of its excellent mechanical characteristics and heat resistance.

However, because of the strong water repellency which is a feature of said material membrane, it is required, in certain cases, to wet the membrane at the time of use in order to develop the performance of the dry membrane for, for example, oxyethylene gas sterilization. For this purpose, it is known to impregnate the membrane with a hydrophilic substance such as glycerine or a surface active agent. Also, various methods were examined for making the membrane itself hydrophilic, and proposals made for improvement of the resistance to contamination and of the adaptability to the living body.

As one of such methods, an attempt was made to make the polymer itself hydrophilic by chemical modification, using sulfonation by concentrated sulfuric acid (Japanese Publication No. SHO 55-36296). However, although this method may make the polymer hydrophilic, the actual performance and quality of the separating membrane are not disclosed, and the membrane forming method is not clearly presented.

For a blend of a polysulfone and a hydrophilic polymer, spinning with addition of a polyvinylpyrrolidone or poly(ethylene glycol) has been examined in order to improve the spinnability (Journal of Applied Polymer Science, Vol. 20, 2377-2394). Also, although the membrane is in the form of a sheet, a method of extracting and removing the hydrophilic polymer after making the membrane by a similar procedure has been shown (Japanese Patent Publication No. SHO 55-106243). Further, Japanese Patent Publication No. SHO 58-104940 indicates a method of cross-linking and fixing the hydrophilic polymer in the membrane by a cross-linking agent or a physicochemical catalyst, but the procedure is very complicated, the intended membrane performance may be damaged, and the effect is hardly said to be satisfactory. Japanese Patent Publication No. SHO 61-93801 shows medial application with the amount of addition of the hydrophilic polymer reduced, but, as noted, complete extraction and removal are difficult.

Also, in Japanese Patent Publications Nos. SHO 61-238306, SHO 63-97205 and SHO 63-97634, a method of cross-linking and fixing the hydrophilic polymer by heat or radiation treatment are described, but a membrane of small holes substantially preventing albumin from leaking is not provided.

On the other hand, a method of fixing a hydrophilic polymer or compound on the surface of the membrane is disclosed in Japanese Patent publications Nos. SHO 62-11503, SHO 63-68646 and SHO 62-125802. However, the methods shown in these Patent Publications are not always satisfactory in making the membrane hydrophilic or unable to suppress elution of the hydrophilic compound from the membrane at the time of actual use, and are not practically applicable to the medical or industrial field where a high degree of cleanliness is required.

SUMMARY OF THE INVENTION

The present invention is designed to resolve the problems in the prior art, and to provide a selectively transmissive polysulfonic hollow fiber membrane which displays less elution into water and a sharp molecular weight fractionation, and is thus safely usable in the fields of medicine and foodstuffs through separation of unnecessary substances and separation and recovery of useful substances or, more particularly, separation of substances of smaller molecular weight. There is also provided a method of producing such hollow fiber membrane stably and with ease.

The present invention provides a selectively transmissive polysulfonic hollow fiber membrane containing a hydrophilic polymer cross-linked into a water-insoluble form and present in the membrane structure in a hydrogel state in the presence of a sufficient amount of water.

Further, the method of producing a selectively transmissive polysulfonic hollow fiber membrane of the present invention is characterised in that a hollow fiber membrane formed by using a spinning solution containing a polysulfonic resin and a hydrophilic polymer is wetted to at least the saturated moisture content and, while maintaining said wet condition and in a water-containing hydrogel structure, is subjected to radiation cross-linking.

A suitable sulfonic resin has repeating units of formula (1) or (2).

[Formula 1]

(1)

[Formula 2]

(2)

In either case, the resin may contain a functional group or an alkyl group without any particular limitation.

The selectively transmissive polysulfonic hollow fiber membrane comprising such resin may be produced by combining it with a hydrophilic polymer and transforming it into a hollow fiber membrane by a known method. That is, to the polysulfonic resin and hydrophilic polymer, a solvent for dissolving them and an additive such as water for controlling the hole size are added, and the mixture is stirred and dissolved into a homogeneous spinning solution which is then spun into a hollow fiber by a known method.

For the hydrophilic polymer, a highly hydrophilic polymer such as polyvinylpyrrolidone (hereinafter PVP) or poly(ethylene glycol) may be used.

For the solvent dissolving both polysulfonic resin and hydrophilic polymer, dimethyl acetamide (abbreviated as DMAc in the following), dimethyl sulfoxide (abbreviated as DMSO in the following) and N-methylpyrrolidone may be used independently or as a mixture.

The molecular weight and concentration of the polysulfonic resin and those of the hydrophilic polymer, and the type of the solvent or combination of solvents, and the amount of any additive greatly affect not only the membrane and its formation but also the performance and mechanical property of the membrane, and so they must be carefully chosen.

The concentration of the polysulfonic resin in the spinning solution forming the selectively transmissive polysulfonic hollow fiber for the membrane of the present invention is preferably within the range of 10–30% by weight.

Particularly, for the purpose of the present invention, the hydrophilic polymer can be present in a Considerable amount, and, by ensuring that it is firmly fixed to the inside of the membrane by radiation cross-linking, it is possible to give a sufficient hydrophilic property and a high moisture absorption to the membrane. However, as the hydrophilic polymer in the membrane swells, it affects the transmissivity, and so the amount of the hydrophilic polymer is preferably adjusted so that it is contained in the membrane in an amount of 1–20% by weight or, more preferably, 3–15% by weight. That is, the amount of the hydrophilic polymer in the spinning solution is preferably 3–30% by weight, or in terms of the proportion of the whole polymer in the spinning solution, it is preferably 5–70% by weight or, more preferably, 15–50% by weight. The moisture absorption of the hollow fibre membrane thus obtained is some 10–50% by weight, and in the case of the hollow fiber membrane having a particularly suitable transmissivity, it shows a more preferable moisture absorption of 5–30% by weight and has yet a satisfactory hydrophilic property.

Next, the molecular weight of the hydrophilic polymer used in accordance with the invention will be considered. As one of the factors covering the molecular weight, elimination of the hydrophilic polymer contributes to formation of small holes in the membrane. That is, with greater molecular weight, the hole diameter of the membrane increases, and particularly when the solution sealed in the hollow fiber is of low coagulation, the foregoing trend is intensified. On the other hand, with greater molecular weight, the cross-linking reaction proceeds more easily to facilitate fixing to the membrane. Accordingly, a hydrophilic polymer of a molecular weight of preferably 10,000–500,000 or, more preferably, 30,000–100,000 is desirable. Further, the composition of the solution injected and sealed in the hollow fiber plays an important role particularly for control of the hole size on account of its coagulating property. When the solution is not very coagulative, the hole diameter on the inner surface of the hollow fiber membrane tends to increase the water permeability whilst a protein leak is produced. When highly coagulative, the protein leak disappears, but the water permeability becomes low. Accordingly, it is desirable to adjust the composition of the injecting solution according to the use or purpose of the hollow fiber membrane.

However, compared with the conventional hollow fiber membrane, a module containing the membrane according to the present invention features in that it shows a high water permeability yet can avoid any protein leak being noted. This is because the transmission balance of the membrane is improved by the hydrophilic polymer being concentrated (partially distributed) at the thick layer close to the inner surface of the membrane.

Also, notwithstanding its high water permeability, the selectively transmissive polysulfonic hollow fiber membrane of the present invention may be capable of a sharp molecular weight fractionation, particularly in a use free from protein clogging such as, for example, a filter for removal of endotoxin. That is, a module of a small membrane area can provide a high removal performance without accompanying pressure loss in the circuit, thus allowing supply of an endotoxin-free filtrate.

A module containing the hollow fiber for the membrane of the present invention is normally discharged from an annular slit nozzle according to the dry/wet spinning method under the conditions set forth as above, coagulated, washed with water and, with glycerine or any other drying preventive agent added in order to prevent deterioration of the membrane performance due to drying, is taken up, then cut into a predetermined length; the sealed solution in the hollow fiber is then removed and the fibers are made into a bundle.

For radiation cross-linking of such hollow fiber membrane, the following methods are preferably used, namely (1) Radiation cross-linking in the state of the bundle; and (2) First transforming into a module, then radiation cross-linking.

The required exposure dose for cross-linking is 10–50 KGy; when it is lower, the cross-linking tends to proceed unsatisfactorily, and when it is higher, the hollow fiber membrane tends to degrade.

When the radiation cross-linking is made on the fiber in the form of a bundle, the sticking glycerine impedes the progress of cross-linking, and so it is desirable either to remove entirely or reduce the amount of glycerine to a minimum before cross-linking to reduce stickiness or to have the cross-linking carried out without prior glycerine treatment. In such case, the cross-linking is to be made under strict control to prevent the membrane performance from being degraded by drying to destruction of the hydrogel structure. Thereafter, module formation is made by a similar method to that for an ordinary bundle.

Transformation into a module is made by a well-known method.

Normally, a polyurethane potting material is used, and the bundle is placed in a case of, say, styrene resin, and a centrifugal potting is made. Here, a potting material of heat resistant epoxy or silicone resin and a case of acrylonitrile-styrene (AS) or polycarbonate resin may be used, or the bundle may be kept standing and its bottom subjected to potting, that is, the so-called stationary potting may be performed. Anyway, it is desireable that the module formation is made according to the purpose or use, and here any material which allows transmission of the radiation required for cross-linking and fixing of the hydrophilic polymer of the present invention is usable. Thereafter, the end face of the module is cut, the opening part of the hollow fiber is adjusted and a header, packing, etc. are fitted; then a leak test is made.

Next, the very small amount of solvent remaining inside the hollow fiber membrane and the glycerine added for prevention of drying should be washed off with water. At this time, it is not necessary to take care of the hydrophilic polymer in the membrane as it is later cross-linked and fixed into a water-insoluble form. However, it is preferable that the whole membrane is kept in a satisfactorily wet condition. More preferably, water is charged in the module (over the saturated moisture content). Normally, the saturated moisture content of the hollow fiber membrane is about 400%, and the moisture content is preferably maintained over said percentage.

The saturated moisture content is expressed as the percentage ratio of the moisture content of the hollow fiber membrane when centrifugally dehydrated at 0.5G for 1 minute to the weight of the hollow fiber membrane when dried at 130° C. for 5 hours, and in the examples described later, the hollow fiber membrane is water charged and is thus maintained at about 1000%. When the moisture is less than the saturated moisture content, cross-linking of the water-soluble polymer by radiation may not be satisfactory, tending to reduce the water-insoluble portion produced by cross-linking of the water-soluble polymer.

While the module is maintained in a satisfactory wet condition, the hydrophilic polymer is exposed to radiation, preferably, more specifically, to gamma-ray radiation for cross-linking by radiation is more exactly and evenly carried out.

At this time, the polysulfonic resin or potting material and case may be degraded simultaneously with cross-linking of the hydrophilic polymer. Therefore, the exposure dose is preferably within the range of 10–50 KGy. By the radiation, the hollow fiber may have the elongation more or less decreased or the header and case may be colored but not to an extend posing a problem.

By such exposure to radiation, it is possible to simultaneously sterilize the module. The exposure dose allowing sterilization in such case is within the range of 10–50 KGy as used in the cross-linking stated above, but in actual sterilization, it is preferable to determine the D value which shows the relationship between the exposure dose and the sterilizing efficiency (ratio of the number of germs after radiation to that before radiation) in the module and set the exposure does accordingly.

For the radiation, gamma- or X-rays may be used, but gammarays are preferable from the point of view of transmissivity and ease of cross-linking treatment. When X-rays are used, it is preferable to use electron-transformed X-rays which are advantageous in the equipment. But, in the case of transformed X-rays, their transmissivity is inferior to that of gamma-rays, and so it is preferable to properly adjust the exposure method including the thickness and disposition of the object.

The hollow fiber membrane having the hydrophilic polymer thus cross-linked and fixed shows an excellent value of 0.1 or less in "extinction" at a layer length of 10 mm and a wavelength of 220–350 nm in the ultraviolet absorption spectrum when the elute is evaluated according to the method described in the elute test for dialytic membranes in the "Dialyzer Quality and Testing Method" shown in the "Dialytic Artificial Kidney Device Approval Standards" (referred to later as the "Artificial Standards").

To further clean the module, the charged solution including the elute is once discharged, and the module is washed with water again. Then, the module is charged with water or a physiological salt solution, as required. At this time, it is possible to add hydrogen peroxide to the charging water in order to enhance the sterilizing effect.

The module is then sealed in a polyethylene bag and packed in a corrugated cardboard case. Under such conditions, sterilization by exposure to radiation (gamma-ray) is made, and in this case, the D value is also measured to determine the adequate exposure dose. In this case, if the exposure is too much, the membrane material or case may degrade, and so it is desirable to radiate no more than an adequate dose.

As stated above, the selectively transmissive polysulfonic hollow fiber membrane of the present invention has a high water permeability, yet it maintains an excellent balance of performance substantially free from protein leak, and so as a rule drying is made in the producing process.

Probably on account of the production according to the foregoing method, the selectively transmissive polysulfonic hollow fiber membrane of the present invention is completed in a characteristic form of hydrogel. That is, the added hydrophilic polymer is dispersed through the membrane and is cross-linked and fixed in a firmly twisted state. This is clearly observed by an optical microscope when the hollow fiber membrane is immersed in DMAc and the polysulfonic polymer in the membrane is extracted to present the cross-linked hydrophilic polymer maintaining a hollow fiber form.

Thus, it has become possible to reduce considerably the amount of polymer eluted from the membrane and impart a sufficient hydrophilic property to the membrane by making the hydrophilic polymer insoluble in water through radiation cross-linking. In consequence the membrane can be used as a selectively transmissive hollow fiber membrane in the form of a hydrogel which is excellent in transmission of the elute.

DESCRIPTION OF PREFERRED EMBODIMENTS

Figure 1:
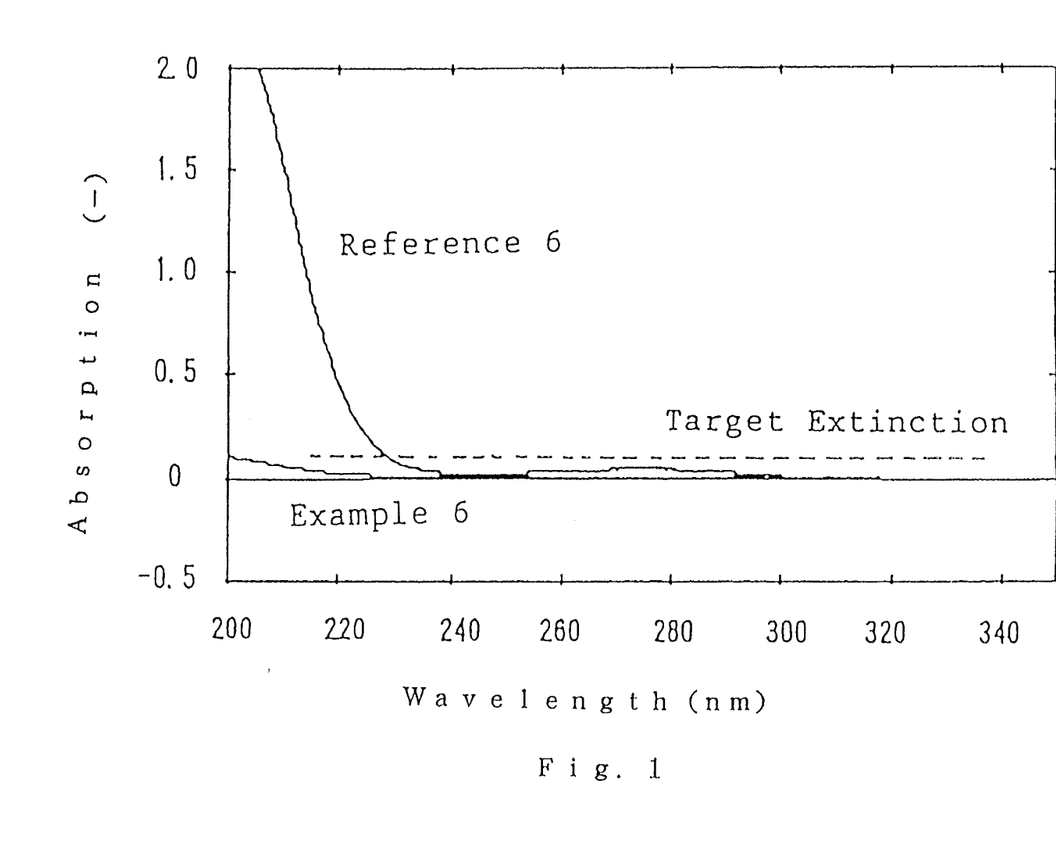
FIG. 1 shows the ultraviolet absorption spectra of the extracts of the hollow fiber membranes of Example 6 and Reference 6 as measured by a spectro photometer UV-160 (product of Shimadzu, Ltd.). As seen from the absorption spectra in FIG. 1, the extinction of the extract solution from the cross-linked hollow fiber membrane of Example 6 is very low as compared with that of the extract solution from the uncross-linked hollow membrane of Reference 6. That is, it is lower than the target extinction, thus indicating that the elute is exceedingly reduced.
Figure 2:
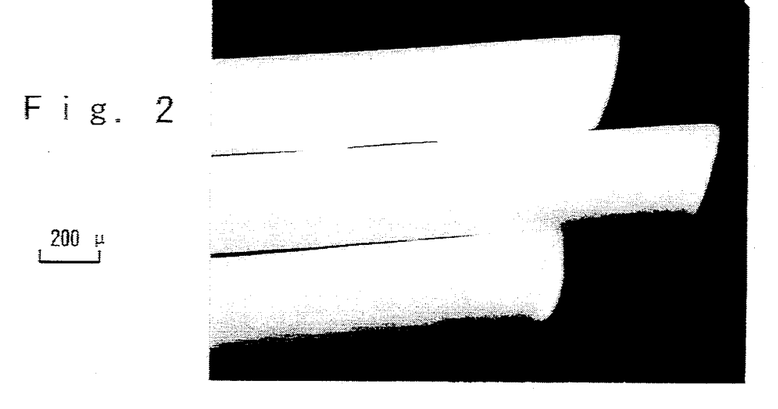
FIG. 2 is a microscopic photograph (50 magnifications) showing the fibrous form in water of the selectively transmissive polysulfonic hollow fiber membrane of the present invention containing cross-linked PVP. As shown, the hollow fiber membrane of the present invention containing cross-linked PVP does not have the PVP eluted in water and maintains the hollow fiber form.
Figure 3:
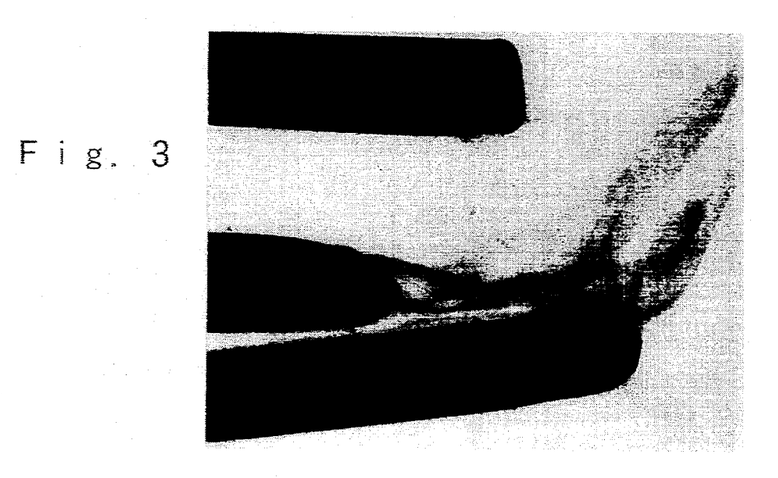
FIG. 3 is a microscopic photograph (50 magnifications) showing the fibrous form of the polysulfonic hollow fiber membrane when dissolved in DMAc before gamma-ray cross-linking of PVP contained in the hollow fiber. From FIG. 3, it will be seen that polysulfone and PVP have eluted so that the fiber is deformed.
Figure 4:
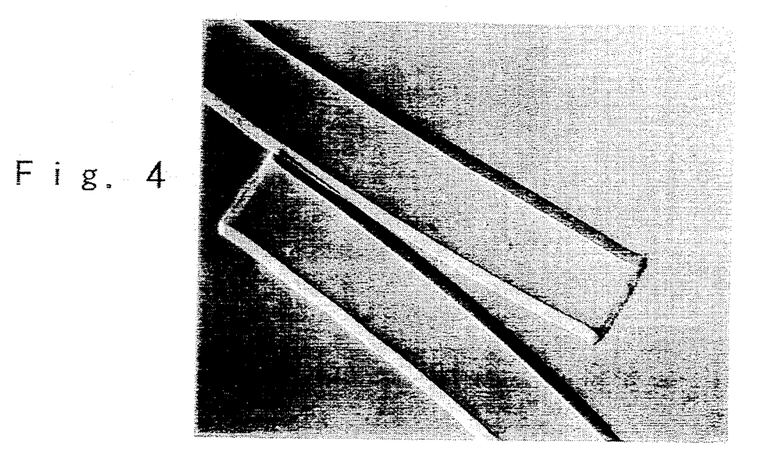
FIG. 4 is a microscopic photograph (50 magnifications) showing the form of the fiber when the selectively transmissive polysulfonic hollow fiber membrane of the present invention is dissolved in DMAc after gamma-ray cross-linking of PVP present in the hollow fiber membrane. From FIG. 4, it will be seen that the transparent cross-linked PVP does not dissolve in DMAc and maintains the hollow fiber form even after the polysulfone has been dissolved.
Figure 5:
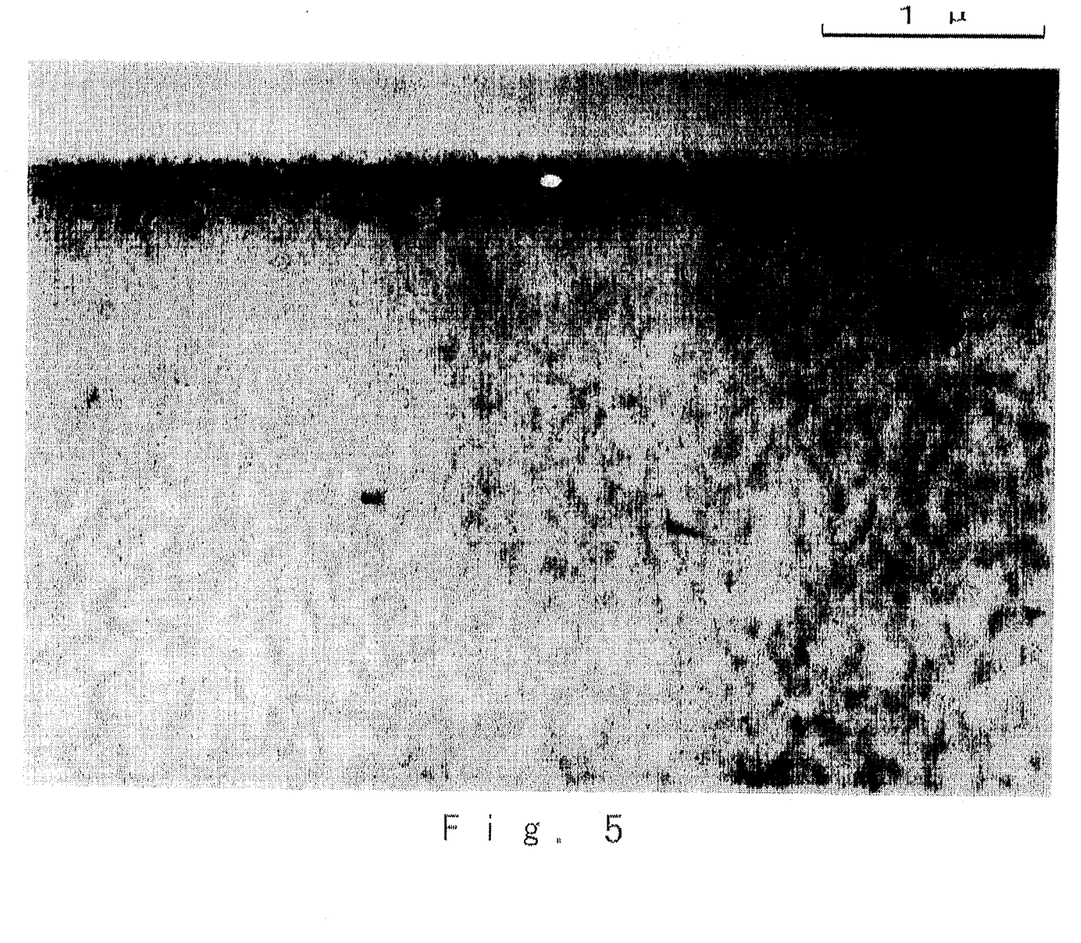
FIG. 5 is a transmission type electron-microscopic photograph (40,000 magnifications) of the fibrous structure of the hollow fiber membrane on the opposite side (inner side) of FIG. 6 when observed in a very thin slice. As seen from FIG. 5, the PVP component dyed with osmic acid (black) is concentrated near the inner surface of the hollow fiber.
Figure 6:
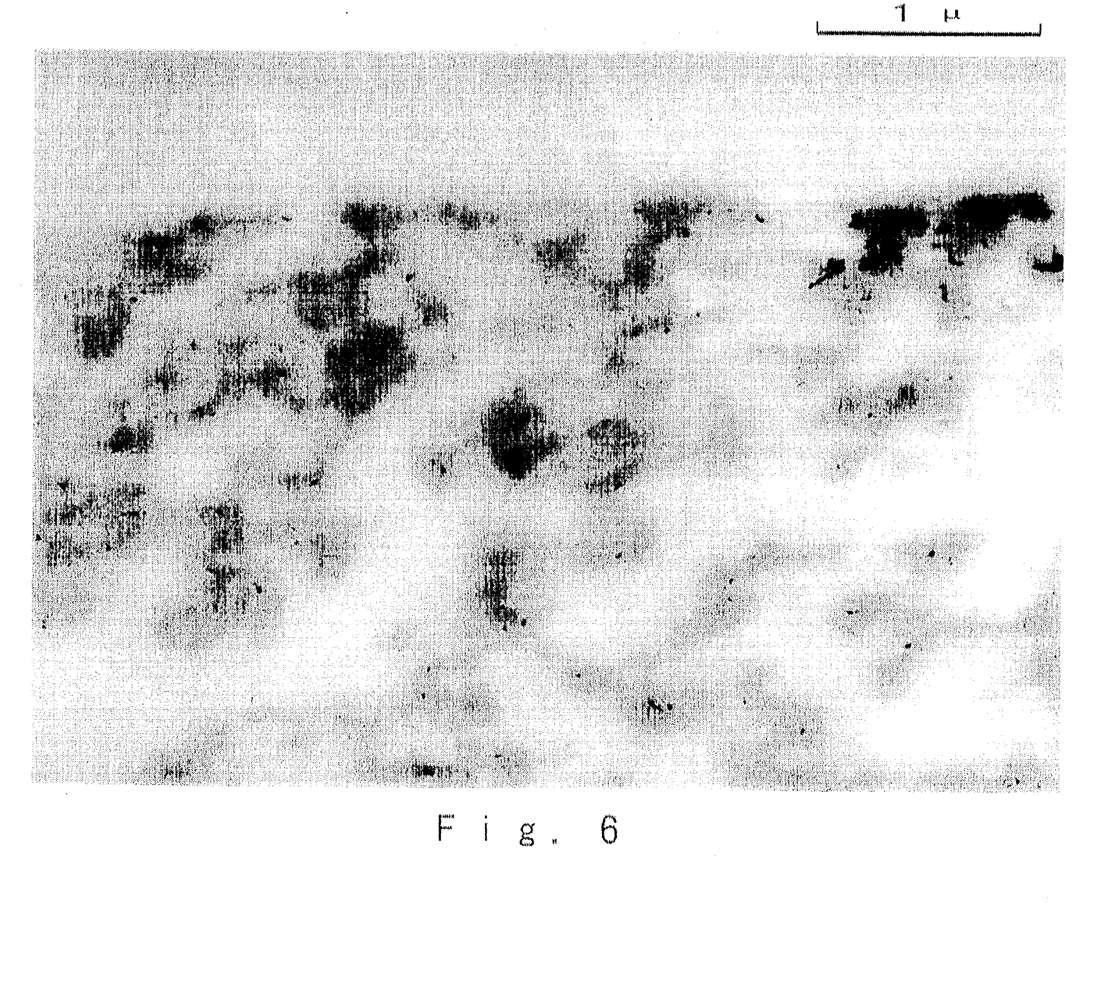
FIG. 6 is a transmission type electron-microscopic photograph (40,000 magnifications) of the fibrous structure of the hollow fiber membrane when observed in a very thin slice. From FIG. 6, it will be seen that the PVP component dyed with osmic acid (black) is present only scarcely near the outer surface of the hollow fiber membrane. The grey part is the polysulfone.

The present invention will now be described with reference to the following Evaluation Procedures and Examples.

Evaluation Procedures

Evaluation of the characteristics of the hollow fiber membrane was according to the following methods.

Amount of Elute

According to the "Elute Test of Dialytic Membrane", Artificial Kidney Standards.

1.5 g of the membrane was placed in 150 ml of water, and the solution was heated at $70°\pm5°$ C. for 1 hour to give a test solution. With a blank test solution previously boiled and cooled taken as a reference, the ultraviolet extinction at a layer length of 10 mm and a wavelength of 220–350 nm was determined. The ultraviolet extinction is normally highest at 220 nm, and so the following values of extinction show the values at 220 nm.

DMAc Insoluble Component

A mixture of 1 g of the membrane dried at 120° C. for 5 hours and 50 ml of DMAc was thoroughly stirred for 5 hours using a rotor, then filtered with a pre-weighed glass filter (2G-2), and the percentage (by weight) of the solid component obtained by drying at 130° C. for 8 hours to the whole amount of the membrane was taken as the DMAc insoluble component.

PVP Content

The PVP content was calculated from the total nitrogen determined, using an elemental analyzer (product of Yanagimoto Seisakusho: CHN Coder MT-5).

Cross-linked PVP Content

The amount of PVP which became cross-linked was determined by measuring the amount of PVP dissolved out of the membrane by DMAc and subtracting this from the amount of PVP originally incorporated in the membrane.

Dispersion of Cross-linked PVP

The hollow fiber membrane was immersed in DMAc and allowed to stand for 24 hours, then the membrane was observed with an optical microscope.

The hollow fiber membrane was dyed with osmic acid to give a very think slice, then the PVP dispersion was examined through a transmission type electron-microscope.

Moisture Absorption

Weighing the hollow fiber membrane of a constant weight in a desiccator of phosphorus pentoxide, then weighing the hollow fiber of a constant weight in a desiccator of 100% humidity and 25° C., the percentage of moisture to the amount of the polymer was calculated.

Transmissivity of Hollow Fiber Membrane

Using 30 threads of the hollow fiber of a length of 15 cm, a small glass tube module was prepared, and water transmissivity at a differential pressure between the outside and the inside of the membrane of about 100 mmHg (water UFRS: $ml/hr/mmHg/m^2$) was calculated.

Also, while circulating bovine plasma of a total protein of 7.5 g/dl through said module at 0.6 ml/min, it was filtered at a trans-membrane pressure of 50 mmHg for 1 hour, and from the mean value of filtration, the transmissivity of bovine plasma (bovine plasma UFRS: $ml/hr/mmHg/m^2$) was measured, while by a protein test of the filtrate (Albusticks, product of Miles and Sankyo K. K.), the albumin leak was examined.

Further, in similar modules, aqueous solutions of solutes such as myoglobin (molecular weight: 16,800, 60 ppm), pepsin (molecular weight: 35,000, 300 ppm) and bovine albumin (molecular weight: 67,000, 300 ppm) were respectively circulated at a flow rate of 1.5 ml/min, and by measuring the concentrations of the solutes in the transmitting solutions, the coefficients of transmission of the respective solutes were calculated.

Sieving coefficient=(Transmitting solution concentration/ Supply solution concentration)

Transmitting Capacity of Module

Using a module comprising 5,000–9,000 hollow fibers and having a membrane area of about 0.7–1.2 $m^2$ water transmissivity was measured using physiological salt solution (physiological salt solution UFRP: ml/hr/mmHg).

Next, circulating the bovine blood of hematocrit at 35% by weight and protein content at 4.5 g/dl at a flow rate of 200 ml/min, the maximum transmissivity of the module (plateau UFR: ml/min) was measured. Also, changing the transmembrane pressure, transmissibity with cattle blood (bovine blood UFCO: ml/fr/mmHg) was measures. Albumin concentrations in the original blood and filtrate were measured by the BCG method to determine the albumin transmissivity (%). That the module does not substantially transmit albumin means that the albumin transmissibity is 5% or less.

On the other hand, using a similar module, dialyzance of urea (1000 ppm), creatinine (200 ppm), phosphoric acid (50 ppm) and vitamin B12 (20 ppm) was measured in a physiological salt solution system. The flow rate on the blood side was 200 ml/min, and that on the dialysate side was 500 ml/min, and the filtering speed was 10 ml/min.

The transmitting capacity was evaluated at 37° C. for both hollow fiber and module.

Endotoxin Removing Capacity

Preparing a module having a membrane area of about 0.7 $m^2$, a solution having city water filtered by a filter of about 0.3 $\mu m$ was supplied from the outside to the inside of the hollow fiber at a rate of 500 ml/min. Measuring the pressure loss at this time and also the endotoxin concentrations in the supply solution and transmitting solution by the limulus test method (Wako Junyaku K. K.), the removal rate of endotoxin (abbreviated as ET) was calculated.

$$K_{(ET)} = (A-B)/A \times 100 (\%)$$

where $K_{(ET)}$: ET removal rate;
A: Supply solution ET concentration; and
B: Transmitting solution ET concentration.

Example 1

18 Parts by weight of polysulfone (P-3500: AMOCO product) and 9 parts by weight of PVP (K-30: molecular weight, 40,000: BASF product) were added to 43 parts by weight of DMAc, 29 parts by weight of DMSO and 1 part of water, and, maintaining the mixture at a temperature of 80° C. and stirring it for 15 hours to dissolve the components, a spinning solution was prepared. This spinning solution was homogeneous and clear, giving a viscosity of 58 poise at 25° C. (falling ball viscosity: JIS-Z8803).

The spinning solution was discharged into the air at a rate of 2.0 g/min from a sheath-core type nozzle having an annular hole of 0.35 mmo outer diameter and 0.05 mmo width and an inner hole of 0.15 mmo diameter. At the same time, water was discharged from the inner hole at a rate of 1.3 g/min. After passing through the air for a length of 300 mm, the spinning solution was introduced to a coagulating bath (DMAc: water=20:80) at 20° C. for coagulation, then after washing with water, the solution held in the hollow fiber was replaced by a 70% by weight aqueous solution of glycerine, and the fiber was taken up in the form of a hank at the take-up speed of 33 m/min.

The hollow fiber thus obtained gave a water UFRS of 780 ml/hr/mmHg/m$^2$ and a bovine blood plasma UFRS of 36 ml/hr/mmHg/m$^2$. The protein test on the filtrate gave —, and no leakage was observed.

Then a module of a membrane area of 0.7 m$^2$ was prepared from the hollow fiber, and said module was washed with warm water of 35° C., then, charged with water, was subjected to gamma-ray radiation at a dose of 25 KGy. The extinction of the solution extracted from the hollow fiber membrane of the module was 0.048.

Further, after discharge from the module of the charged solution, the module was then washed with water again sealed in a polyethylene bag, packed as a product module and then sterilized by gamma-ray radiation of 25 KGy dose.

The module thus provided showed a high performance of 403 ml/hr/mmHg in the physiological salt solution UFRP, 90 ml/min in the plateau UFR according to the bovine blood evaluation, and 50 ml/hr/mmHg in the bovine blood UFCO. The transmissivity of albumin in the filtrate was 0.21%, indicating substantially no leak. Also, the module had a high transmitting capacity, giving the dialyzance as set forth below.

| Urea | Creatinine | Phosphoric acid | VB12 |
| --- | --- | --- | --- |
| 170 | 147 | 142 | 93 |

The PVP content of the hollow fiber membrane taken out of the module was 5.8% by weight. Further, the extinction of the extract solution from the hollow fiber membrane was 0.046, yet a highly hydrophilic property was exhibited with the moisture absorption at 21.3% by weight.

Example 2

18 Parts by weight of polysulfone (P-3500) and 18 parts by weight of PVP (K-30) were added to 38 parts by weight of DMAc, 25 parts by weight of DMSO and 1 part by weight of water, and while maintaining at a temperature of 80° C., the mixture was stirred for 15 hours to dissolve the components. Using the spinning solution thus obtained, spinning was carried out similarly to Example 1.

The obtained hollow fiber was placed in a test tube, and, charged with water, it was exposed to gamma-ray radiation of a dose of 25 KGy. After radiation, the hollow fiber gave a water UFRS of 360 ml/hr/mmHg/m$^2$ and a bovine blood plasma UDRS of 23 ml/hr/mmHg/m$^2$. The protein test of the filtrate was ±, and thus substantially no leak was observed. The PVP content in the hollow fiber membrane was very high at 8.7% by weight, yet the extinction of the extracted solution from the hollow fiber membrane was 0.093, representing a high cleaning property.

Example 3

18 Parts by weight of poly(ether sulfone) (VICTREX 4800P: ICI product) and 9 parts by weight of PVP (K-30) were added to 72.6 parts by weight of DMSO and 0.4 part of water, and while maintaining at a temperature of 80° C., the mixture was stirred for 6 hours to dissolve the components, and thus a spinning solution was provided. This spinning solution was homogeneous and clear, with a viscosity of 104 poise at 25° C.

Using the foregoing spinning solution, spinning was carried out, using water as an injecting solution as in Example 1. The water UFRS of the hollow fiber thus provided was 260 ml/hr/mmHg/m$^2$. The bovine blood plasma UFRS was 28 ml/hr/mmHg/m$^2$, and the protein test of the filtrate was —, and leakage was not at all observed. Further, the hollow fiber was placed in a test tube, and, charged with water, it was exposed to gamma-ray radiation of 25 KGy. The extinction of the solution extracted from the gamma-ray radiated hollow fiber membrane was 0.064. With the DMAc insoluble component at 9% by weight and moisture absorption at 32.7% by weight, the membrane maintained a good hydrophilic property.

Example 4

4 Parts by weight of a polysulfone (P-3500) and 12 parts by weight of another polysulfone (P-1700: AMOCO product) and 6 parts by weight of PVP (K-90: molecular weight, 360,000: BASF product) were added to 47 parts by weight of DMAc, 30 parts by weight of DMSO and 1 part by weight of water, and while maintaining at a temperature of 80° C., the mixture was stirred for 15 hours to dissolve the components, and thus a spinning solution was provided. Using this spinning solution of a viscosity of 64 poise at 30° C., spinning was carried out similarly to Example 1.

The water UFRS of the hollow fiber thus obtained was 180 ml/hr/mmHg/m$^2$. The bovine blood plasma UFRS was 26 ml/hr/mmHg/m$^2$, and the protein test of the filtrate was ± with little leakage observed.

Preparing a module of a membrane area of 0.72 m$^2$ from this hollow fiber, said module was washed with warm water of 35° C., then, charged with water, it was exposed to gamma-ray radiation at a dose of 25 KGy.

The extinction of the solution extracted from the hollow fiber membrane of the module was 0.047. Further, after discharging the charged solution from the module, the module was washed with water again, then subjected to sterilization of gamma-ray radiation of 25 KGy.

The module showed a high performance with the physiological salt solution UFRP at 126 ml/hr/mmHg, plateau UFR according to bovine blood evaluation at 86 ml/min, and bovine blood UFCO at 43 ml/hr/mmHg. Transmission of the albumin in the filtrate was 0.26% by weight, and so substantially no leak was observed. Also, the module gave high values of dialyzance as shown below.

| Urea | Creatinine | Phosphoric acid | VB12 |
| --- | --- | --- | --- |
| 167 | 144 | 138 | 94 |

Also, the hollow fiber membrane taken out of the module showed a highly hydrophilic property with the DMAc insoluble component at 13.6% by weight and moisture absorption at 21.3% by weight, yet it gave a low level of elution with the extinction of the solution extracted from the hollow fiber membrane at 0.046 and had a highly cleaning property with the extinction of the charged solution in the module at 0.115.

Example 5

Using a spinning solution obtained by adding 18 parts by weight of polysulfone (P-3500) and 9 parts by weight of PVP (K-30) to 44 parts by weight of DMAc, 28 parts by weight of DMSO and 1 part by weight of water and stirring for 15 hours at a temperature of 80° C., spinning was made similarly to Example 1 except that the composition of the injecting solution was changed to DMAc/water=60/40. Then, from the hollow fiber, a module having a membrane area of 1.14 $m^2$ was prepared, and after water washing and charging with water, gamma-ray radiation was carried out at an exposure dose of 25 KGy. Further, after exhausting the charged solution, the module was washed with water again then subjected to sterilization by 25 KGy dose gamma-ray radiation.

The module thus obtained showed a high performance with the physiological salt solution UFRP at 955 ml/hr/mmHg/$m^2$, plateau UFR by bovine blood at 106 ml/min, and bovine blood UFCO at 72 ml/hr/mmHg. Transmission of the albumin in the filtrate was 0.26%, substantially no leakage being observed. Dialyzance of the module also showed high values.

| Urea | Creatinine | Phosphoric acid | VB12 |
| --- | --- | --- | --- |
| 190 | 175 | 172 | 125 |

The module showed a low level of elution with the extinction of the solution extracted from the hollow fiber membrane at 0.037 and had a highly cleaning property with the extinction of the charged solution in the module at 0.119.

Example 6

A spinning solution obtained by dissolving 15 parts by weight of polysulfone (P-3500) and 9 parts of PVP (K-30) in 45 parts by weight of DMAc, 30 parts by weight of DMSO and 1 part by weight of water was spun as in Example 1.

The water UFRS of the hollow fiber obtained was 950 ml/hr/mmHg/$m^2$. The protein test of the filtrate by the bovine blood plasma was −, and no leakage at all was observed.

A module of a membrane area of 0.67 $m^2$, prepared from the hollow fiber, was washed with water, then, charged with water, was exposed to gamma-ray radiation at a dose of 25 KGy.

The extinction of the solution extracted from the hollow fiber membrane of the module was 0.053. Further, when the ET removal capacity of the module was evaluated, the pressure loss at the flow of 500 ml/min was 98 mmHg notwithstanding a low membrane area of 0.67 $m^2$.

Also, from a supply solution of an ET concentration of 66 pg/dl, a transmission solution of an ET concentration of 0.01 pg/dl or less was obtainable, and thus the module showed an excellent performance as an ET filter.

Example 7

Using the hollow fiber obtained in Example 6, a small module of an effective length of 9 cm and a membrane area of 22 $cm^2$ was prepared, and the sieving coefficients of various solutes were measured. As the result, it was found that there was obtained a membrane of very sharp fractionation, as shown in the following table.

| Solutes | (Molecular weight) | Concentration (ppm) | Transmission coefficient |
| --- | --- | --- | --- |
| Myoglobin | (16,800) | 60 | 0.956 |
| Pepsin | (35,000) | 300 | 0.529 |
| Bovine albumin | (67,000) | 300 | 0.111 |

Using a commercial PMMa (poly(methyl methacrylate)) hollow fiber membrane, the same module as that in Example 7 was prepared, and the same measurement was made, when the sieving coefficients of the solutes were: myoglobin, 0.77; pepsin, 0.23; and albumin, 0.17.

References 1-6

The uncross-linked hollow fiber membranes as obtained in Examples 1-6 gave high values of extinction of the extracted solutions respectively at 0.265, 1.020, 0.316, 0.479, 0.271 and 0.493; they were unable to check elution of PVP from the membrane and were unacceptable under the artificial kidney standards and not suitable for applications requiring cleanliness.

Example 8

Adding 18 parts by weight of polysulfone (P-3500) and 9 parts by weight of PVP (K-30) to 72 parts by weight of DMAc and 1 part by weight of water, the mixture was stirred for 15 hours at a temperature of 80° C., and there was obtained a homogeneous and clear spinning solution of 40 poise at 26° C. With the composition of the injecting solution set at DMAc/water=60/40, a hollow fiber of an inner diameter of 200 μm and a membrane thickness of 40 μm was spun at a spinning speed of 35 m/min after the method of Example 1. Preparing a module of a membrane area of 1.70 $m^2$ from a bundle of said hollow fiber, and under the condition having water filled, subjected to gamma-ray radiation at a dose of 25 KGy for cross-linking of PVP and sterilization of the module.

The obtained module showed a high performance with the water permeability of water UFRP at 1117 ml/hr/mmHg/$m^2$. Plateau UFR by bovine blood evaluation at 120, and transmissive performance blood B-

UFCO at 75. The value of SC-Alb in this membrane was 0.15%, and leakage was scarcely noted. Dialyzance of the module also showed a high value.

| Urea | Creatinine | Phosphoric acid | VB12 |
| --- | --- | --- | --- |
| 195 | 189 | 187 | 153 |

Further, the extract solution from said hollow fiber membrane giving UVabs.=0.059, the elution level was low against UVabs.=0.153 of the non-crosslinked hollow fiber membrane, and thus the module presented an outstanding purification performance.

Effects of the Invention

According to the present invention, there is provided a hollow fiber membrane which is free from elution from the membrane, allows addition of a hydrophilic polymer to give a sufficient hydrophilic property to the membrane and is suitable for use in the fields of medicine and foodstuffs and those requiring membrane separation where excellent filtering capacity and cleanliness are required.

We claim:

1. A module for selective transmission of substances to provide fractionation of said substances by molecular weight, comprising a selectively transmissive polysulfonic hollow fiber membrane containing a hydrophilic polymer cross-linked into a water insoluble form and present within the membrane structure in a dispersed form in the state of a hydrogel in the presence of sufficient water.

2. A module according to claim 1, wherein the water content is at least as high as the saturated moisture content of the cross-linked hydrophilic polymer.

3. A module according to claim 1, wherein the albumin transmissivity of the selectively transmissive polysulfonic hollow fiber membrane is 5% or less.

4. A module according to claim 1, wherein the hydrophilic polymer is polyvinylpyrrolidone.

5. A module according to claim 4, wherein said polyvinylpyrrolidone is of a molecular weight not less than 10,000 nor more than 500,000.

6. A module according to claim 1, wherein the hydrophilic polymer is poly(ethylene glycol).

7. A module according to claim 1, wherein the selectively transmissive polysulfonic hollow fiber membrane is a polysulfone hollow fiber membrane or a poly(ether sulfone) hollow fiber membrane.

8. A module according to claim 1, wherein the cross-linked and water insoluble hydrophilic polymer independently maintains the hollow fiber form if the polysulfonic resin is removed.

9. A module according to claim 1, wherein the hydrophilic polymer present in the hollow fiber membrane is largely located near the inner surface of the hollow fiber membrane.

* * * * *